UNITED STATES PATENT OFFICE.

WILLIAM B. LUPTON, OF PITTSBURG, PENNSYLVANIA.

IMPROVED COMPOSITION FOR CORE-POWDER.

Specification forming part of Letters Patent No. 53,460, dated March 27, 1866.

*To all whom it may concern:*

Be it known that I, WILLIAM B. LUPTON, of Pittsburg, in the county of Allegheny and State of Pennsylvania, have invented a new and Improved Composition for Core-Powder; and I do hereby declare that the following is a full, clear, and exact description thereof, which will enable those skilled in the art to make and use the same.

This invention relates to a composition which is intended as a substitute for flour generally mixed with sand used for the preparation of cores in casting.

My composition is made of ground clay and ground coal-tar pitch, which are mixed together in about the following proportions: clay, one part; coal-tar pitch, two parts. Each of these ingredients is reduced to a fine powder by grating or other suitable means, and the two are intimately mixed. The mixture is applicable as a substitute for flour in making sand cores. I mix it with the sand in about the same proportion generally used for the flour—viz., one part of my mixture to five parts of sand.

My mixture is much cheaper than flour and more convenient to use. The clay causes the sand and pitch to adhere when moist, and when the mixture is submitted to a heat of about 150° it is held together by the pitch, and the core is not liable to crumble to pieces during the process of forming or of drying it.

What I claim as new, and desire to secure by Letters Patent, is—

A compound made of the ingredients herein specified, to be used in combination with sand in the process of forming sand cores, as set forth.

WM. B. LUPTON.

Witnesses:
   J. H. BORLAND,
   WM. C. BORLAND.